May 12, 1970 R. K. SHELBY ETAL 3,511,018
METHOD FOR SEALING TWO-PIECE CONTAINERS
Filed Dec. 20, 1966 5 Sheets-Sheet 1

INVENTORS
RICHARD K. SHELBY
JAY W. RAPP
BY
Robert J. Schaup
ATTORNEY

INVENTORS
RICHARD K. SHELBY
JAY W. RAPP
BY
*Robert J. Schaap*
ATTORNEY

INVENTORS
RICHARD K. SHELBY
JAY W. RAPP
BY
Robert J. Schaap
ATTORNEY

FIG. 15
FIG. 16
FIG. 17
FIG. 20
FIG. 21

United States Patent Office 3,511,018
Patented May 12, 1970

3,511,018
METHOD FOR SEALING TWO-PIECE CONTAINERS

Richard K. Shelby, Chicago, and Jay W. Rapp, Park Ridge, Ill., assignors to Monsanto Company, St. Louis, Mo., a corporation of Delaware
Continuation-in-part of applications Ser. No. 508,412, Oct. 18, 1965, and Ser. No. 546,990, May 2, 1966. This application Dec. 20, 1966, Ser. No. 603,220
Int. Cl. B65b 7/28, 51/14
U.S. Cl. 53—42        6 Claims

ABSTRACT OF THE DISCLOSURE

The method of sealing a cover member to a receptacle where the receptacle is provided with a groove to receive a flange on the cover member. The material forming the flange in the cover member and the groove on the receptacle is heated so that the flange can be reversely bent and extended into the groove so that the cover member becomes permanently sealed to the receptacle.

---

This application is a continuation-in-part of copending application Ser. No. 508,412, filed Oct. 18, 1965, which is in turn, a divisional application of my copending application Ser. No. 335,087, filed Jan. 2, 1964. This present application is also a continuation-in-part of copending application Ser. No. 546,990, filed May 2, 1966 now U.S. Patent No. 3,428,238, which is, in turn, a continuation-in-part of copending application Ser. No. 335,087, filed Jan. 2, 1964.

This invention relates in general to certain new and useful improvements in plastic containers and more particularly to the apparatus and method for sealing two-piece nestable portions of plastic containers in a unitary structure.

Today, plastic and synthetic resin material have found widespread use in the packaging industry because of the inexpensiveness of the raw material and the mass production methods of manufacturing. Plastic containers have been rapidly replacing both metal and paperboard containers inasmuch as the plastic type of container can be readily molded in an inexpensive mass production operation. Moreover, containers formed of plastic and synthetic resinous materials are adapted to be hermetically sealed and are capable of holding fine powders and low viscosity liquids.

The use of plastic as a material for the manufacture of nestable containers such as drinking cups and the like has met with widespread success inasmuch as the nestable items are capable of being shipped for large distances without absorbing large transportation costs. However, sealed containers, such as powder cans and the like, which are non-nestable, cannot be stacked in small packages and consequently consume a great deal of shipping space. While large shipping cases of non-nestable containers do not have a great mass, they do have a great bulk and this bulk consumes a great deal of expense in transportation. Inasmuch as the non-nestable containers must absorb this considerable transportation cost, they have been usually limited to within approximately 150 miles radius from the source of manufacture. As a result thereof, the marketing of non-nestable containers and more particularly, non-nestable plastic containers has been seriously hampered.

In an effort to obviate the difficulty of the non-nestable container, various manufacturers and producers of containers have resorted to two-piece nestable sections which are ultimately formed or connected into a unitary structure. The manufacturers of metal containers, such as powder cans, now produce nestable container portions with nestable cover members which can be shipped for large distances. At their destination, the cover member can be secured to or hermetically sealed to the container portion by a conventional crimping mechanism. Plastic articles are not capable of being connected by this type of operation and manufacturers of two-piece nestable plastic sections have resorted to the use of cement and similar methods of fusion. However, there is no convenient method of sealing two-section nestable containers into a unitary structure at their destination in a mass-production operation. The methods presently employed require the packager using the nestable containers to install the necessary equipment for performing the sealing operations. However, the equipment presently available is relatively expensive and the labor time consumed in order to perform the necessary operations is quite considerable. Due to this expense, many of the users of sealed containers have shifted to containers being formed of other materials.

It is, therefore, the primary object of the present invention to provide an apparatus and method for sealing multiple-piece plastic containers which can be readily sealed into a unitary structure on a mass-production basis.

It is another object of the present invention to provide an economical method of sealing multiple-piece plastic containers, which method is relatively inexpensive, rapid and efficient.

It is a further object of the present invention to provide an apparatus for sealing multiple-piece plastic containers on a low cost and mass production basis.

It is also an object of the present invention to provide an apparatus and method for sealing two-piece, thin-walled containers of the type stated which are disposable and can be mass produced at a relatively low unit cost.

It is another salient object of the present invention to provide plastic containers of the type stated which are capable of withstanding the abuse normally subjected to such type of containers and which have a readily marketable appearance.

With the above and other objects in view, our invention resides in the novel features of form, construction, arrangement and combination of parts presently described and pointed out.

In the accompanying drawings (5 sheets):

FIGS. 6, 7 and 8 are sequential enlarged sectional views schematically showing the method of sealing a cover member to a container in accordance with the present invention, of which:

FIGS. 9 and 10 are sequential enlarged sectional views schematically illustrating the method of sealing a modified form of cover member to a modified form of receptacle, thereby forming a modified form of seal, of which:

FIGS. 11 and 12 are sequential enlarged sectional views showing the method of sealing another modified form of cover member to a modified form of receptacle thereby producing a modified form of sealed joint therebetween of which:

FIGS. 13 and 14 are sequential enlarged sectional views showing the method of sealing another modified form of cover member to another modified form of receptacle thereby producing a modified form of joint therebetween, of which:

FIGS. 15, 16 and 17 are sequential enlarged sectional views showing the method of sealing a rectangularly shaped cover member to a rectangularly shaped receptacle in accordance with the present invention, of which:

FIGS. 18 and 19 are sequential enlarged sectional views showing the method of sealing a modified form of rectangularly shaped cover member to a modified form of rectangularly shaped receptacle in accordance with the present invention, of which:

FIGS. 20 and 21 are sequential enlarged sectional views showing the method of sealing another modified form of rectangularly shaped cover member to another modified form of rectangularly shaped receptacle in accordance with the present invention, of which:

GENERAL DESCRIPTION

Generally speaking, the present invention provides an apparatus and a method for sealing cover members to receptacles of the type described in my copending application Ser. No. 335,087, filed Jan. 2, 1964 and of the type described in my copending application Ser. No. 546,990, filed May 2, 1966. The present invention also provides a series of dies which are used for a number of embodiments of the two-piece containers.

The apparatus and the method are designed to seal each of the embodiments of the aforementioned containers in a mass-production operation, wherein the container is continuously moved through a series of stations and in which the cover member is sealed to the receptacle. The apparatus generally comprises a circular rotating table which is provided with a series of receptacle accommodating apertures. Disposed above the table in proximate radial alignment with each of the apertures is a cylindrical housing containing nested receptacles and which is adapted to deposit a receptacle in each aperture, as the aperture passes beneath the receptacle housing. This receptacle housing constitutes a first station. At a second station, a cover member housing is provided and contains a stack of nested cover members. This housing is similarly provided with means for depositing a cover member on a receptacle as the receptacle passes therebeneath. This cover member housing constitutes a second station. As the receptacle, which is disposed with an aperture, passes between the first and second stations, it is suitably filled with any suitable material that it is designed to contain.

The receptacle with the cover member disposed thereon is next passed to a third station where a male die engages the cover member and forces the same into intimate contact with the receptacle. Simultaneously therewith, the receptacle is lowered so that the cover member and receptacle are maintained in contact with a heated female die for sealing the cover member to the receptacle. This contact with the heated female die is maintained for a predetermined period until the material in contact therewith becomes sufficiently flexible; at which time the male die subjects the cover member to an instantaneous downwardly directed force where the cover member is sealed to the receptacle. Thereafter, the sealed container is ejected from the aperture and deposited upon a suitable conveyor mechanism at a fourth station. A suitable driving mechanism is provided for operating each of the aforementioned functions in pretimed relationship.

The present invention provides four sets of dies for sealing four modifications of circularly shaped containers and three sets of dies for sealing three embodiments of rectangularly shaped containers. In each of the containers of the present invention, the receptacle is generally provided along its upper margin with a reversely bent downwardly extending flange forming an annular groove. The cover member of the circular container is also formed with an annular downwardly flaring flange which is capable of being heated into a flexible condition and bent inwardly into the groove formed on the receptacle. In the first of these modifications, the dies are designed to force the flange on the cover member into the groove formed in the receptacle so that the flange fits snugly between the rim-forming flange of the receptacle in the side wall of the receptacle. In the second embodiment of the circularly shaped containers, the dies are designed to cause the flanges on each of the cover member and receptacle to curl inwardly into the groove formed by the flange on the receptacle. In the third modification of the circular container, each of the flanges on the cover member and receptacle is curled inwardly in the form of an annular bead and bent back upon themselves so that they are horizontally disposed. In the fourth modification of the circular container, the flange on the cover member is curled inwardly in the form of a bead so that it is disposed in the groove formed on the receptacle. However, the flange of the cover member, which is turned inwardly and upwardly, is spaced from the side wall of the receptacle and engages the rim-forming flange of the receptacle.

In each of the aforementioned embodiments, the flanges on the cover member and receptacle may be raised to a temperature where a reorientation of the plastic material takes place and forms a heat seal or fusion between the two flanges, thereby permanently heat sealing the cover member to the receptacle. Furthermore, the temperature of the dies may always be maintained at a point where the plastic material is heated to a temperature below the reorientation temperature of the plastic material and above the temperature where the material becomes flexible. In this manner, where the plastic material is sufficiently above the low-softening range and sufficiently below the orientation temperature, a fluid-tight mechanical seal may be attained. The heat and pressure of forcing the two dies together is sufficient to cause the free terminal margins of the flange on the receptacle or the flange on the receptacle and flange on the cover member to become readily deformable. The flanges are thereby urged into the groove on the receptacle where a mechanical seal takes place.

The present invention also provides the cooperating sets of dies for sealing the three rectangularly shaped containers. The rectangularly shaped containers and the dies and method for sealing the cover member to the receptacle thereof, are very similar to the circularly shaped containers except that in the rectangularly shaped containers, a reinforcing groove is formed in the cover member. In the first embodiment of the rectangularly shaped container, the flange on the cover member is struck inwardly into a groove formed on the receptacle and is permanently disposed therein. In the second modification of the rectangular container, each of the flanges on the cover member and receptacle is curled inwardly in the form of an annular bead so that they are vertically disposed. In the third modification of the rectangular container, the flange on the cover member is curled inwardly in the form of a bead so that it is disposed in the groove formed on the receptacle. However, the flange of the cover member, which is turned inwardly and upwardly, is spaced from the side wall of the receptacle and engages the rim-forming flange of the receptacle. In each of the aforementioned embodiments, the flanges on the cover member and receptacle may be raised to a temperature where a reorientation of the plastic material takes place and forms a heat seal or fusion between the two flanges, thereby permanently heat sealing the cover member to the receptacle. Furthermore, the temperature of the dies may always be maintained at a point where the plastic material is heated to a temperature below the reorientation temperature of the plastic material and above the temperature where the material becomes flexible. In this manner, where the plastic material is sufficiently above the low-softening range and sufficiently below the orientation temperature, a fluid-tight mechanical seal may be attained. The heat and pressure of forcing the two dies together is sufficient to cause the free terminal margins of the flange on the receptacle or the flange on the receptacle and flange on the cover member to become readily deformable. The flanges are thereby urged into the groove on the receptacle where a mechanical seal takes place.

DETAILED DESCRIPTION

Referring now in more detail and by reference characters to the drawings which illustrate practical embodiments of the present invention, A designates an apparatus for permanently sealing a cover member C to a receptacle R, forming part of a two-piece container set or so-called "container" B. The apparatus is more fully illustrated in FIGS. 1–5. Much of the supporting structure and sub-structure for the apparatus A has been eliminated from the drawings and the description herein in order to maintain clarity inasmuch as the detail of the supporting structure are conventional in their construction.

The apparatus A generally comprises a circular rotating table 2 which is provided on its underside, somewhat radially spaced from the center thereof, with a groove which is fitted with a bearing race 3 for retaining roller bearings 4 in which manner the table 2 is rotatably supported. The table 2 was provided somewhat centrally thereof with a depending hub 5 and rigidly secured to its peripheral surface is a ring gear 6 in meshing engagement with a drive gear 7, the latter being secured to the upper end of a vertically extending drive shaft 8. By reference to FIG. 3, it can be seen that the drive shaft 8 is operatively connected to an electric motor 9 which is in turn, provided with support brackets 10 for securement to a suitable supporting structure (not shown).

Figure 1:
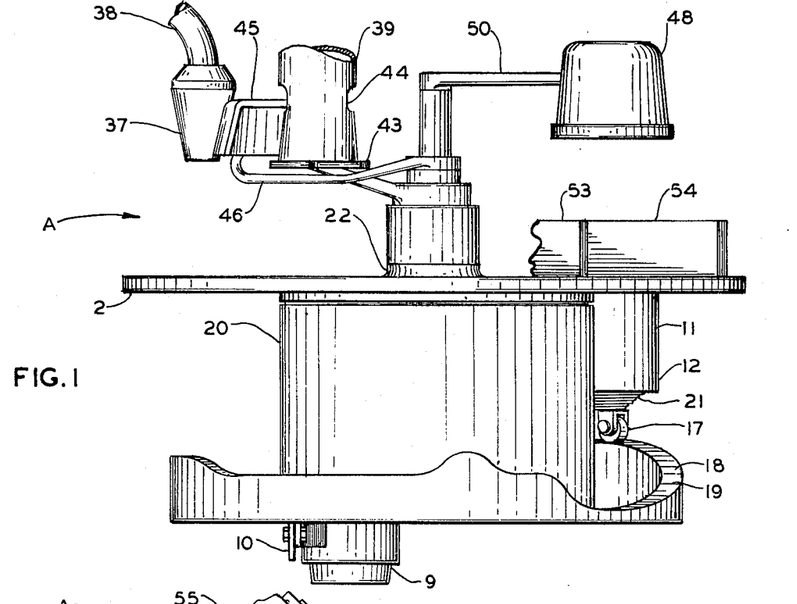
FIG. 1 is a side elevational view, partially broken away, of an apparatus for sealing a cover member to a receptacle which is constructed in accordance with and embodies the present invention.
Figure 2:
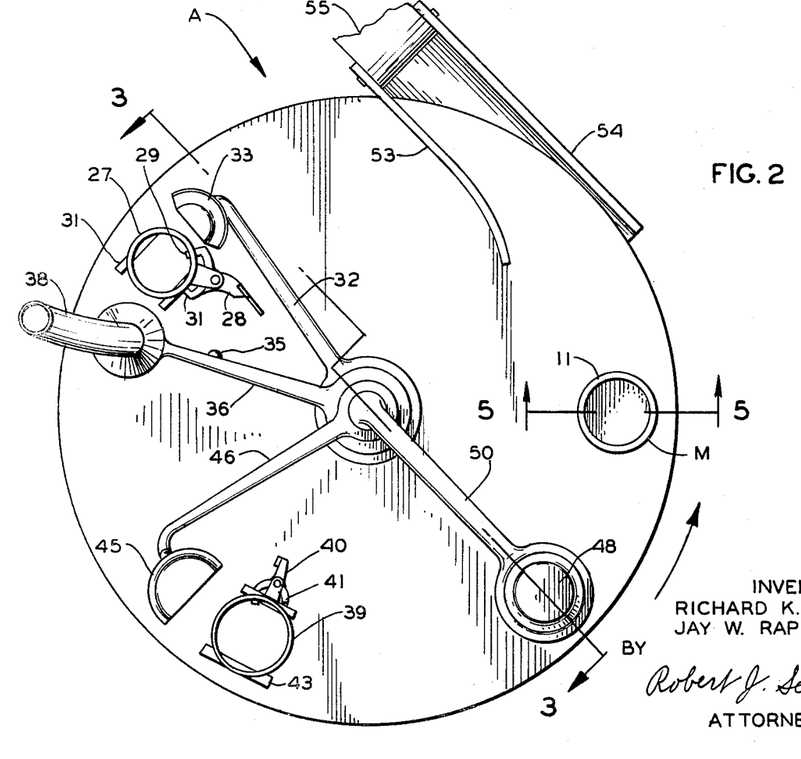
FIG. 2 is a top plan view, partially broken away, of the apparatus of FIG. 1.
Figure 3:
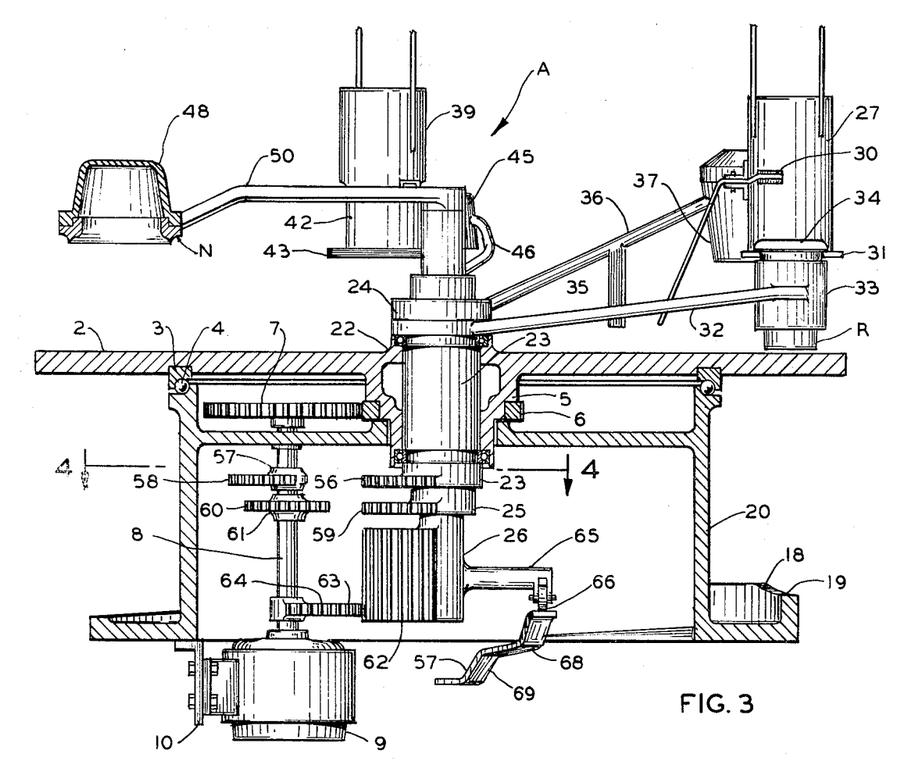
FIG. 3 is a horizontal sectional view taken along line 3—3 of FIG. 2 and showing in detail the driving mechanism forming part of the apparatus of the present invention.
Figure 4:
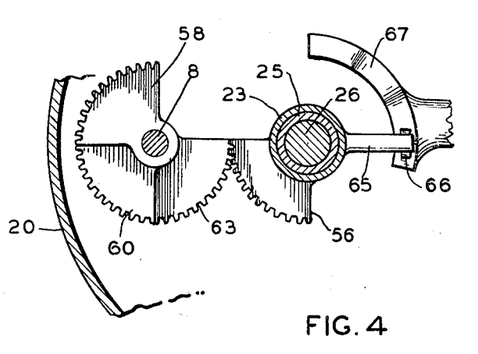
FIG. 4 is a fragmentary sectional view taken along line 4—4 of FIG. 3 and showing the segmental gearing forming a part of the drive mechanism of the present invention.

The table 2 is formed with a series of radially spaced container receiving compartments 11 along its peripheral margin substantially as shown in FIG. 2. The container receiving compartment 11 is cylindrical and includes an annular side wall 12 and bottom wall 13, the latter being provided with a central aperture 14 for accommodating a cam rider shaft 15, which is connected at its upper end to a receptacle retaining plate 16. Mounted on the lower end of the cam rider shaft 15 is a cam rider, or so-called cam follower 17, which moves along and is shiftable by a cam 18 having an upper camming surface 19 and which is secured to a main table support 20, substantially as shown in FIGS. 3 and 4. Furthermore, it can be seen that a compression spring 21 is concentrically disposed about the cam rider shaft 15 and bears against the underside of the bottom wall 13 and the cam rider shaft 15, urging it in a downward direction so that the receptacle retaining plate 16 is always urged to the bottom of the compartment 11, all for reasons which will presently more fully appear.

Rigidly mounted on the upper surface of the table 2 and being rotatable therewith is an upstanding hub 22 and being disposed within the hub 22 are a series of coaxially extending concentric quill shafts 23, 24, 25 and 26, substantially as shown in FIG. 3. The quill shafts 23, 24, 25 and 26 are supported in any conventional manner and are rotatable with respect to each other and with respect to the hub 22 through a series of axially spaced ball bearings (not shown). The structure for suitably supporting each of the quill shafts 23, 24, 25, 26 is conventional and, therefore, neither illustrated nor described in detail herein.

Figure 7:
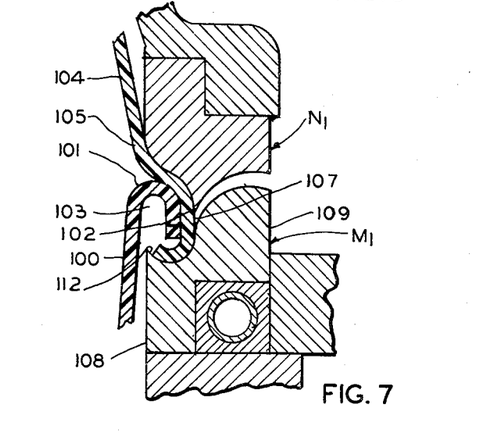
FIG. 7 shows the dies in an intermediate engaged position and the cover member and receptacle in intimate contact with the dies.
Figure 8:
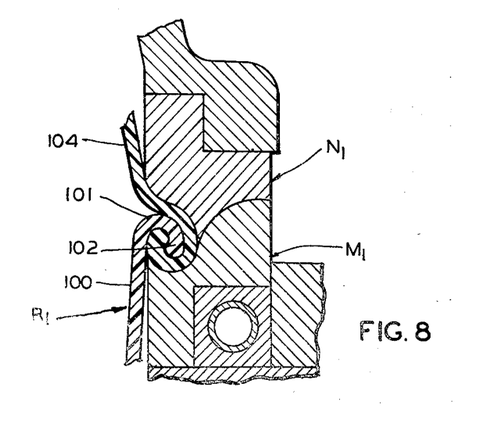
FIG. 8 shows the dies in the fully engaged position and the cover member permanently sealed to the receptacle.

Disposed above the table 2 in proximate alignment with the compartments 11 is a receptacle dispensing housing 27 and which contains a stack of nested receptacles R. Each of the receptacles are held within the housing 27 by a pivotal yoke 28 having a pair of fingers 29, which extend through a slot 30 formed within the side wall of the hoursing 27. The fingers 29 engage the lip of the receptacle R and thereby retain the entire stack. A suitable mechanism is provided for shifting the yoke 28 so that a single receptacle R is separated from the stack of receptacles R and retained at the lower end of the housing 27 by means of a somewhat U-shaped inwardly struck flange 31 at the lower end of the housing 27 so that the lower end of the receptacle R projects downwardly from the housing 27. Rigidly mounted on the quill shaft 23 and being pivotable therewith is an outwardly radially extending arm 32 which is provided at its outer end with a receptacle engaging claw 33. The quill shaft 23 pivots in timed relation to the rotation of the table 2 by a suitable mechanism hereinafter described, and as the compartment 11 moves beneath the housing 27, the quill shaft 23 rotates in a counter clockwise direction reference being made to FIG. 2 and the claw 33 will engage the receptacle R and shift the same outwardly from the housing 27 through a slot 34 formed along the base thereof. The quill shaft 23 is located at a slight distance above the table 2 and the claw 33 is sized to guide the movement of the receptacle R in the compartment 11 substantially as shown in FIGS. 7 and 8.

The arm 32 is designed to engage a depending hook 35 which is formed along a radially extending arm 36, the latter being rigidly secured to and rotatable with the quill shaft 24. Secured to the outer end of the arm 36 and being movable therewith is a dispensing nozzle 37, which is connected to the lower end of a dispensing tube 38, the latter being connected at its other end to a bin (not shown) for dispensing the contents to be charged into the container B, such as a suitable powder or liquid. Naturally, this bin is provided with a suitable charging and weighing mechanism which permits a charge of the material to pass through the nozzle 37 for each receptacle R which passes therebeneath. As soon as the receptacle has been filled to a predetermined depth, in a predetermined time, the arm 32 and the arm 36 will swing in a clockwise direction, reference being made to FIG. 2, to their original position. In this connection, it should be understood that the arms 32 and 36 are spring loaded so that they are urged to rotate in a clockwise direction, referring to FIG. 2, and the arm 32 is driven in the counterclockwise direction through the quill shaft 23. The quill shaft 24 is, in effect, an idler shaft and is not driven.

As the filled receptacle R continues to rotate with the table 2, it is passed beneath a cover member dispensing housing 39, which is provided with a stack of nested cover members C. The stack of cover members C are maintained within the housing 39 by means of a yoke 40 which is substantially similar to the yoke 28 and is provided with a pair of cover member engaging fingers 41 which extend through apertures 42 formed within the side wall of the housing 39. The yoke 40 is driven through a suitable mechanism in timed relation to the movement of the table 2 and is adapted to reciprocate so that the fingers 41 engage the lower margins of the cover member C, and as the fingers 41 swing, they will permit a single cover member to separate from the remainder of the stack. This latter cover member C which has been separated from the stack is then deposited on a pair of upwardly struck flanges 43 formed along the lower end of the housing 39. The housing 39 is also provided with an enlarged slot 44 along its lower end and is designed to accommodate a cover member engaging claw 45, which shifts through the slot 44 and engages a deposited cover member C retained therein. The clow 45 is secured to the curved lower end of a downwardly and radially outwardly extending arm 46, the latter, in turn, being rigidly secured to and rotatable with the quill shaft 25. Thus, through the above-outlined construction, the yoke 40 will shift through a suitable mechanism (not shown) in timed relation to the table 2 and deposit a single cover member C on the inwardly struck flanges 43. The cover member engaging claw 45 will engage the single cover member deposited on the flange 43 as it passes through the slot 44 and carry the same in direct marginal registration with the receptacle R disposed therebeneath as the receptacle rotates in a counter clockwise direction. The arm 46 carried on the quill shaft 25 is so located that the cover member C is physically placed on the upper margin of the receptacle R as the table 2 and arm 46 continue to rotate in timed relation. After this occurs, the quill shaft 25 will rotate in a clockwise direction to its original position, reference being made to FIG. 2. In this connection, the cover member C is sized to snugly engage the exterior surfaces of the receptacle R, and is retentively held on the receptacle R.

Figure 5:
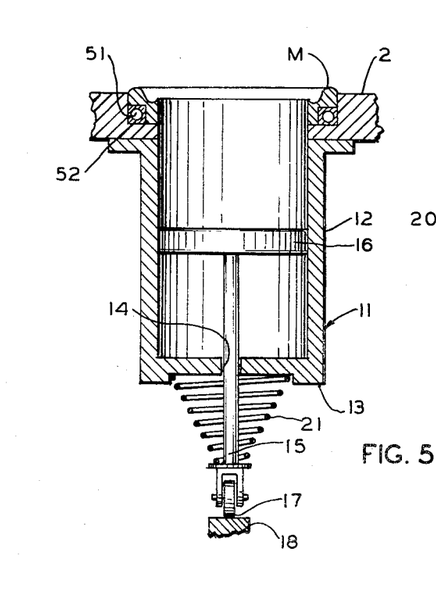
FIG. 5 is a fragmentary sectional view taken along line 5—5 of FIG. 2.

By reference to FIG. 5, it can be seen that the receptacle R is maintained in a position so that the upper margins thereof are spaced somewhat above the upper margin of the table 2. This is accomplished by the cam rider 17, which rides along the camming surface 19 and thereby maintains the retaining plate 16 in a raised position against the action of the compression spring 21.

The upper end of the compartment 11 is provided with a femal die M substantially as shown in FIG. 5 and which cooperates with a male die frame 48 (see FIG. 3), having a cooperating male die N formed along the lower margins thereof. The male die frame 48 is mounted on the lower end of a downwardly and outwardly extending arm 50, which is secured at its upper end to the quill shaft 26 and is rotatable therewith. As the table 2 continually rotates in the counter clockwise direction, reference being made to FIG. 2, the quill shaft 26 will rotate through an arc in timed relation thereto. When the filled receptacle R passes beneath the male die frame 48, the quill shaft 26 will shift downwardly through a mechanism hereinafter described and force the cover member into intimate contact with the upper margin of the receptacle R, and furthermore urge the receptacle R and cover member C disposed thereon into intimate contact with the female die M in a manner to be hereinafter described in detail. Simultaneously with the vertical shifting of the quill shaft 26, the cam follower 17 will ride upon a depressed portion of the camming surface 19 and thereby permit the retaining plate 16 to move downwardly within the compartment 11.

The table 2 is preferably an aluminum casting and suitable electrically operated heat elements 51, such as, for example the heating elements known in the trade as "Calrod" elements, are imbedded in a retaining ring 52 which surrounds the female die M, and are connected through suitable conductors such as, for example, brushes and commutators (not shown) to a suitable source of electrical power (also not shown). The heating elements 51 are of such capacity and are so disposed along the outer margin of the female die M that they are effective to maintain female die M at a temperature to heat the free edge portion of the cover member C to such temperature, during the movement of the containers B, which is effective to render the free edge portions readily deformable. In this manner, the free edge portions of the cover member C can be sealed to the free edge portions of the receptacle R in a manner more fully hereinafter described in detail.

The cover member C is heat sealed to the receptacle R during the movement of the table 2 and after continued rotation thereof, the cam follower 17 will ride along a high spot of the camming surface 19 and thereby shift the retaining plate 16 upwardly within the compartment 11. This high spot of the camming surface 19 is designed so that the upper surface of the retaining plate 16 is substantially parallel to the table 2 and the filled and sealed container B retained by the plate 16 is then moved into alignment with two upstanding guide plates 53, 54 which guide the filled container A on a conveyor belt 55 to the ultimate packing station (not shown).

By reference to FIG. 3, it can be seen that each of the quill shafts 23, 25 and 26 projects through the bottom of the table 2. The quill shaft 24 does not project downwardly from the table 2 inasmuch as it is an idler shaft and is not driven. The quill shaft 23 is provided with an annular gear surface 56 which meshes with a drive wheel 57 having a gear segment 58, the drive wheel 57 being mounted on and rotatable with the drive shaft 58. The quill shaft 25 similarly projects through the lower end of the quill shaft 23 and is provided with an annular gear surface 59 in meshing engagement with a gear segment 60 formed on a drive wheel 61, the latter being mounted on the drive shaft 8. Finally, the quill shaft 26 projects through the lower end of the quill shaft 25 and is provided at its lower end with a relatively wide pinion gear 62, which meshes with a gear segment 63 formed on a drive wheel 64, the latter being in turn, mounted on the drive shaft 8. By reference to FIGS. 3 and 4, it can be seen that the drive wheels 57, 61 and 64 are only arcuate segments of circular wheels and the outer periphery of the wheels constitutes the respective gear segments. Furthermore, each of the aforementioned wheels is concentrically mounted on the drive shaft 8 so that through their respective gear segments they are in meshing engagement with the gear surfaces 56, 59 and the gear 62, respectively only for a portion of the rotation of the drive shaft 8. By further reference to FIG. 4, it can be seen that the gear segments on each of the drive wheels extend through an arc of approximately 90 degrees so that, in effect, each of the quill shafts 23, 25 and 26 are only driven through an approximately 90 degree arc before they are spring biased back into their original position. It should again be pointed out that many of the details such as retaining collars for the drive wheels have been eliminated in order to maintain clarity.

The quill shaft 26 has a slightly greater length than any of the quill shafts 23, 24 or 25 as can be seen by reference to FIG. 3. Moreover, the quill shaft 26 is diametrically sized so as to be vertically shiftable within the quill shaft 24. Rigidly secured to the annular surface of the pinion gear 62 is a radially extending camming arm 65 having a depending roller or so-called cam follower 66 which rides along a camming surface 67. The camming surface 67 is suitably formed from a structure which is neither illustrated nor described in detail herein in order to maintian clarity. It should be understood that this camming surface is suitably mounted on the same supporting structure which supports the apparatus A. The camming surface 67 has a substantially horizontal surface for the greater portion of its length and thereby maintains the arm 50 in the same horizontal plane as the table 2 rotates. The camming surface 67 is provided with an arcuate surface or so-called "low" 68 in the area of rotation of the table 2 where the male die N holds the cover member C and recetpacle R in intimate contact with the heated female die M for approximately ten seconds. This arcuate surface or low 68 then merges into a relatively sharp V-shaped drop-off groove 69 where the male die N is designed to engage the cover member C and force the same downwardly into the female die M for permanently sealing the cover member C to the receptacle R.

By this construction, as the cam follower 66 moves along the lower arcuate portion 68 of the camming surface 67, the pinion gear 62 and the quill shaft 26 carried therewith will shift downwardly within the quill shaft 24 thereby permitting the arm 50 to shift downwardly and hold the cover member C in engagement with the heated female die M. This arcuate surface or low 68 has a length which is sufficient to hold the cover member C and receptacle R in engagement with the heated female die M for approximately ten seconds. Thereafter, the cam follower 66 will instantaneously shift into the V-shaped drop-off groove 69 thereby pulling the arm 50 in a further downward direction instantaneously for the final sealing of the cover member C to the receptacle R in this position. The V-shaped drop-off groove 69 is so located that the container B is ejected from the table 2 immediately after the heat sealing operation takes place. After the heat sealing operation has taken place, the cam follower 66 will move to the substantially horizontal portion of the camming surface 67 and thereby raise the pinion gear 62, the quill shaft 26 and the arm 50.

Figure 13:
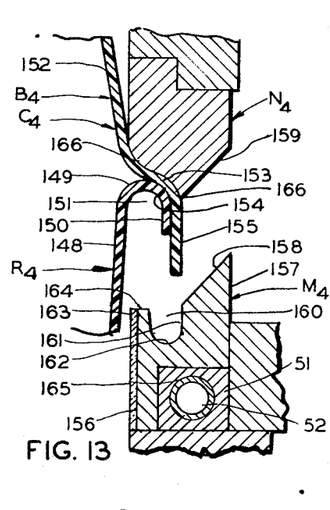
FIG. 13 illustrates the dies which are used to seal the cover member to the receptacle and showing the cover member and receptacle in the separated position.

By further reference to FIG. 2, it can be seen that the apparatus A is so constituted and arranged that there are in effect, four work stations which are disposed around the periphery of the table 2. The first work station is constituted by the receptacle housing 27 and the mechanism associated therewith for depositing the receptacle R in the compartment 11. The second work station is constituted by the cover member housing 39 and the mechanism associated therewith for placing the cover member C on the receptacle R. It can thus be seen that the receptacle R is filled during its movement between the first and second work stations. The male die frame 48 and the mechanism associated therewith for moving the die frame 48 constitutes a third work station where the cover member and receptacle are forced into intimate contact with the heated female die M for permanently sealing the cover member C to the receptacle R. As previously pointed out, the preheating of the cover member and container in the female die M takes place for approximately 10 seconds, in the manner as shown in FIG. 13. This occurs as the cam follower 66 rides along the low 68. When the cam follower 66 shifts downwardly into the drop-off groove 69, the male die frame 48 will force the cover member C into intimate contact with the receptatcle R. The discharging of the sealed container B from the compartment 11 and moving the same on the conveyor belt 55 constitutes a fourth work station. It should, of course, be understood that the heat sealing of the cover member C to the receptacle R takes place during the movement between the third and fourth work stations. Moreover, it can be seen that the work stations are so disposed around the wheel that upon completion of the movement of the table 2 through a 90 degree revolution a receptacle R will be shifted from one work station to the next succeeding work station.

The upper end of the compartment 11 is designed to accommodate various types of female dies M for sealing various types of two-piece container sets B. The container sets for which the apparatus and the dies of the present invention were designed are more specifically described in my copending application Ser. No. 335,087, filed Jan. 2, 1964 and for the containers described in my copending application Ser. No. 546,990, filed May 2, 1966. However, it should be recognized that the apparatus of the present invention is capable of sealing many types of container sets and is not necessarily limited to the types of containers described in said copending applications. The cover members C and receptacles R of the container set B are formed by any convenient process and apparatus such as by the molding machine described in the Richard K. Shelby et al. Pat. No. 2,967,328.

The cover member C and receptacle R are preferably formed of a high impact modified polystyrene. The modified polystyrene material generally comprises approximately 94% polystyrene and approximately 5.0 to 6.0% of a styrene-butadiene rubber. Additionally, the composition of the present invention also contains approximately 2.0% of a mineral oil such as standard aliphatic white mineral oil such as the oil sold under the trademark Westol 35 from Penn Refining Company. The mineral oil employed in the composition preferably designed to have a Saybolt viscosity within the range of 80 to 210 at a temperature of 70° F. While the styrene-butadiene rubber can be varied between 4.0% and 10.0%, the mineral oil can be varied between 0.5% and 3.0% with the polystyrene making up the remainder of the mixture.

Figure 9:
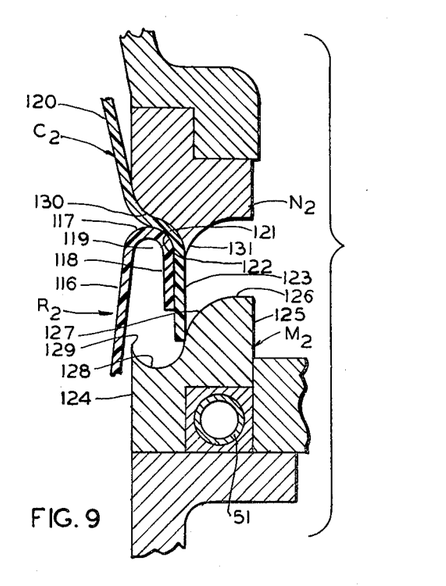
FIG. 9 illustrates the dies which are used to seal the cover member to the receptacle and showing the cover member and receptacle in a separated position.
Figure 10:
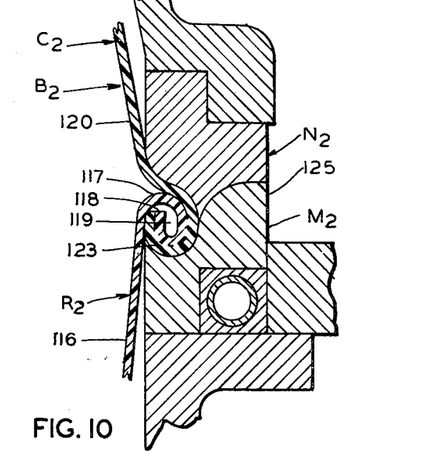
FIG. 10 shows the dies in the fully engaged position and the cover member permanently sealed to the receptacle.
Figure 15:
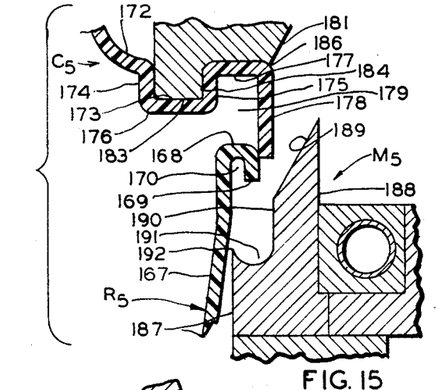
FIG. 15 illustrates the dies which are used to seal the cover member to the receptacle and showing the cover member and receptacle in the dies in the separated position.
Figure 16:
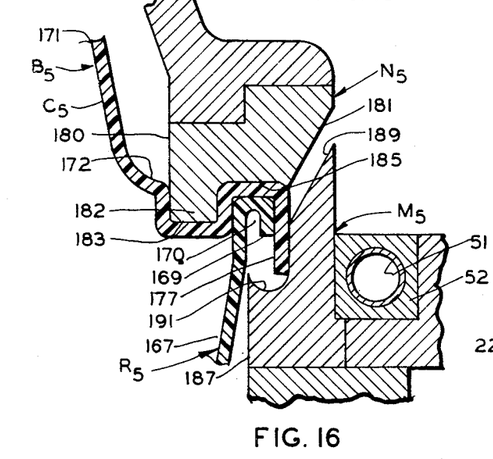
FIG. 16 shows the dies in an intermediate engaged position and the cover member and receptacle in intimate contact with the dies.
Figure 17:
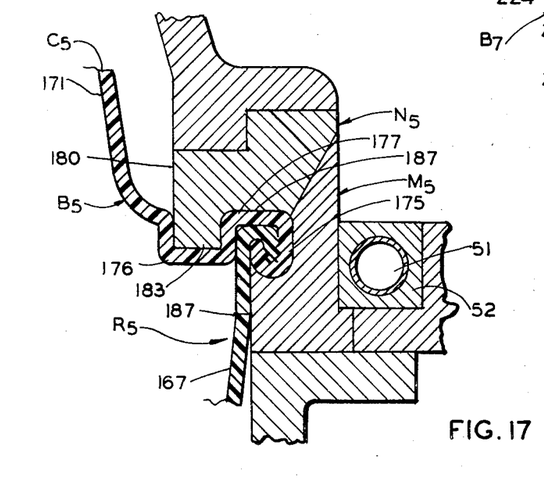
FIG. 17 shows the dies in the fully engaged position and the cover member permanently sealed to the receptacle.
Figure 18:
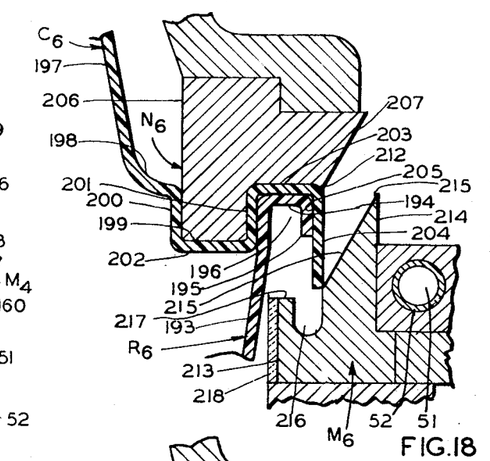
FIG. 18 illustrates the dies which are used to seal the cover member to the receptacle and showing the cover member and receptacle in the separated position.
Figure 19:
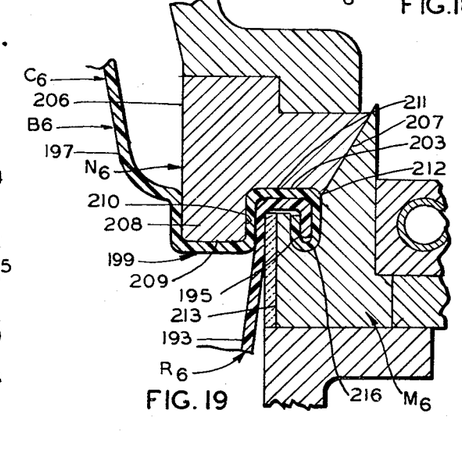
FIG. 19 shows the dies in the fully engaged position and the cover member permanently sealed to the receptacle.
Figure 20:
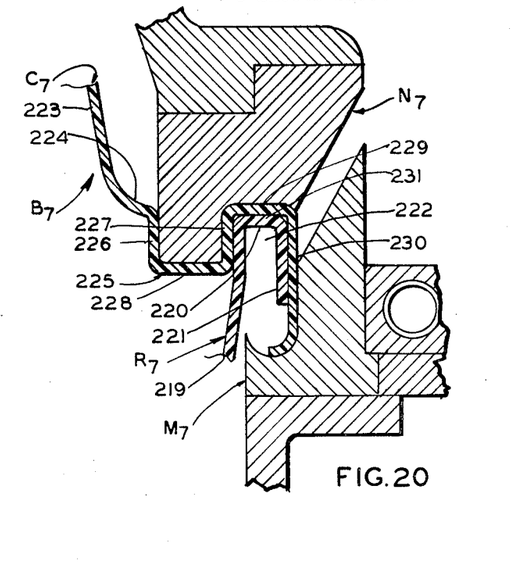
FIG. 20 illustrates the dies which are used to seal the cover member to the receptacle and showing the cover member and receptacle in the separated position.
Figure 21:
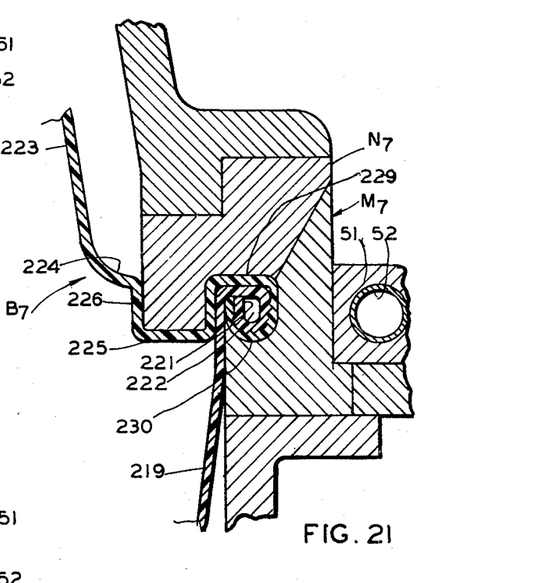
FIG. 21 shows the dies in the fully engaged position and the cover member permanently sealed to the receptacle.

The apparatus of the present invention is suitably designed to both mechanically seal and heat seal cover members to receptacles. The mechanism for performing both the heat seal and the mechanical seal by this apparatus is hereinafter more fully described in detail. The embodiments disclosed in FIGS. 6–14 are circular containers which have a circular bead-forming seal and the dies disclosed in FIGS. 6–14 are designed to produce the circular bead. The embodiment of the circular container disclosed in FIGS. 6–8 has the mechanical seal; the embodiment disclosed in FIGS. 9 and 10 is formed with a heat seal, the embodiment disclosed in FIGS. 11 and 12 has a mechanical seal and the embodiment disclosed in FIGS. 13 and 14 has a heat seal. The embodiments of the containers and the dies disclosed in FIGS. 15–21 are rectangularly shaped containers which contain a reinforcing groove. The embodiment disclosed in FIGS. 15–17 is formed with a heat seal, the embodiment disclosed in FIGS. 18 and 19 is formed with a mechanical seal, and the embodiment disclosed in FIGS. 20 and 21 is formed with a heat seal. It should be understood in connection with the present invention that any of these embodiments could be formed with either a mechanical seal or a heat seal so that each container described herein is not limited to the type of seal illustrated in the drawings. The method of forming either the heat seal or the mechanical seal will be hereinafter described in more detail.

Figure 6:
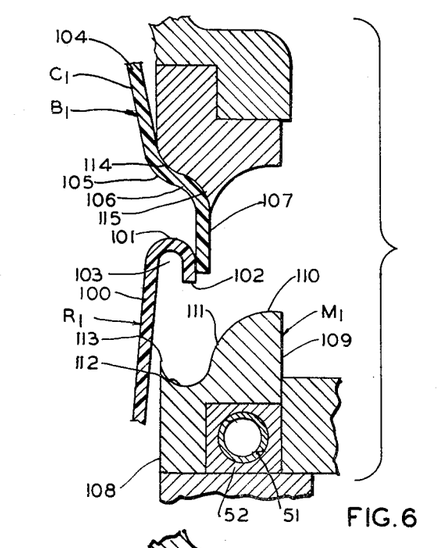
FIG. 6 illustrates the dies forming part of the apparatus and the cover member and the receptacle in the separated position.

Referring now to FIGS. 6–8, portions of a cylindrical container $B_1$ are illustrated as being mechanically sealed in the dies of the present invention. Again, the details of construction of the container are more fully illustrated in copending application Ser. No. 546,990, filed May 2, 1966. The container $B_1$ comprises a receptacle $R_1$ and a cover member $C_1$. The receptacle $R_1$ which is generally circular in horizontal cross section includes an annular skirt-forming wall 100. The receptacle R is integrally provided along its upper margin with an annular outwardly struck lip 101 which merges into an annularly formed downwardly struck rim-forming flange 102, substantially as shown in FIG. 6. The downwardly struck flange 102 is spaced from the skirt-forming wall 100 and thereby forms an annular groove 103. The flange 102 is spaced from the skirt-forming wall 100 by a distance which is approximately equal to the thickness of the flange 102 and moreover, the flange 102 is substantially parallel to the skirt-forming wall 100. Thus, it can be seen that as the skirt-forming wall 100 has a downwardly converging taper, the flange 102 also projects downwardly in parallel relationship thereto.

The cover member $C_1$ which is also circular in horizontal cross section includes an annular skirt 104 which is provided along its lower margin with an annular outwardly struck lip 105, the latter forming an annular shoulder surface 106 on its underside. The surface 106 is supported on the upper surface of the lip 101 when the cover member $C_1$ is sealed to the receptacle $R_1$ substantially as in the manner shown in FIG. 6. The lip 105 is integrally formed with a downwardly struck rim forming flange 107 which is slightly longer than the flange 102. The flange 107 is sized to snugly engage the exterior surface of the flange 102 in frictional contact when the cover member $C_1$ is disposed upon the receptacle $R_1$ in the manner as shown in FIG. 7. The flange 107 is of sufficient length to have a relatively free terminal portion which is capable of being heated to a temperature where it becomes flexible and is upwardly struck into the groove 103. In the sealing operation to be hereinafter described, the terminal portion of the flange 107 is sealed in the annular groove 103 to form a perfect liquid-tight seal between the cover member $C_1$ and the receptacle $R_1$. The cooperating dies used to seal the cover member $C_1$ to the receptacle $R_1$ are also more fully illustrated in FIGS. 6–8.

The cooperating dies generally comprise the female die $M_1$ which cooperates with the male die $N_1$. The dies operate by means of the above-described apparatus to force the cover member $C_1$ into intimate contact with the upper margin of the receptacle $R_1$ and furthermore, urge the receptacle $R_1$ and cover member $C_1$ disposed thereon into intimate contact with the female die $M_1$.

The female die $M_1$ is capable of being inserted into and secured to a container-receiving compartment 11 in the manner as illustrated in FIG. 5. The male die $N_1$ is rigidly secured to the arm 50. The female die $M_1$ is formed with a substantially frusto-conically shaped interior side wall 108, having an enlarged substantially cylindrical head portion 109. The head portion 109 has an arcuate top wall 110 which merges into a generally downwardly and inwardly sloping intermediate wall 111 and extending between the intermediate wall 111 and the frusto-conically shaped side wall 108 is a lower arcuate surface 112 which is concave upwardly in shape and integrally merges into an upwardly extending relatively sharp edge 113 at the point of connection with the side wall 108.

The male die $N_1$ is also substantially circular in horizontal cross section and has a somewhat S-shaped interior wall 114 at its lower end which engages the exterior surface of the lip 105, in the manner as illustrated in FIGS. 6 and 7. The side wall 114 integrally merges at its lower end into a downwardly extending relatively sharp guide flange 115 which engages a portion of the downwardly extending flange 107 on the cover member $C_1$.

The male die $M_1$ is urged into contact with the upper surface of the cover member $C_1$ and the surface 114 of the die $N_1$ engages the lip 105 of the cover member $C_1$, in the manner as in FIG. 6. The female die is substantially circular and provided with a hollow portion so that it accommodates the receptacle $R_1$ in the manner as illustrated in FIG. 7. When the two dies $M_1$, $N_1$ are urged together in a "sealing position," that is the position as illustrated in FIG. 7, the flange 107 will become disposed over and lie in facewise engagement with the flange 102. The heating element 51 will create sufficient heat to bring the two flanges 102 and 107 to the desired post-forming temperature. It has been found in connection with the present invention that the material in the flanges 102, 107 should be heated to approximately 210 to 240° F. for the post-forming operation. At this temperature range, the plastic material is sufficiently above the low-softening range and furthermore, sufficiently below the orientation reorientation temperature of 225 to 260° F. for the particular type of material employed. It has been found that within this temperature range of 210 to 240° F. approximately 6–10 seconds of preheating are desirable before the post-forming operation. The exact low-softening temperature range and the reorientation temperature range will, of coruse, vary depending on the exact composition of the plastic material. During the post-forming operation, the flange 107 is forced into the groove 103 in the manner as illustrated in FIG. 8. In effect, the free edge portion of the flange 107, which has been softened is urged into the groove 103 so that it is in a substantially upwardly struck vertical position. Furthermore, the free edge portion of the flange 107 is in intimate contact with the exterior wall of the receptacle $R_1$. It should be pointed out that the post-forming operation takes place in the manner of a fraction of a second so that the reorientation of the plastic material does not take place. The two dies are moved toward each other in the post-forming operation at a rate of speed which prevents overheating and possible shrinking and undesired curling of the flange. It should be recognized that a fluid-tight mechanical seal is thereby attained. The heat and pressure of forcing the two dies $M_1$, $N_1$ together provides sufficient energy to cause the free terminal margin of the flange 107 to become readily deformable. The flange is thereby mechanically urged into the groove 103. However, a permanent heat seal, wherein the flanges 102 and 107 are fused, does not take place since the plastic material is always maintained below its reorientation temperature.

FIGS. 9 and 10 illustrate the dies employed for a modified form of circularly shaped container $B_2$, which comprises a cover member $C_2$ and a receptacle $R_2$. The container $B_2$ is illustrated with a heat seal as shown in FIG. 10 and is also circular in horizontal cross section. The container $B_2$ is formed in the same manner as the container $B_1$ and moreover, is constructed of the same material as the container $B_1$. The receptacle $R_2$ which is generally circular in horizontal cross section includes an annular skirt forming wall 116. The receptacle $R_2$ is integrally provided along its upper margin with an annular outwardly struck lip 117, which merges into an annularly formed downwardly struck rim forming flange 118 substantially as shown in FIG. 9. The downwardly struck flange 118 is spaced from the skirt-forming wall 116 by a distance which is approximately equal to twice the thickness of the flange 118 and thereby forms a downwardly opening annular groove 119. Furthermore, the flange 118 is substantially parallel to the skirt-forming wall 116. Thus, it can be seen that as the skirt-forming wall 116 has a downwardly converging taper, the flange 118 also projects downwardly in parallel relationship thereto. It is to be noted that the flange 118 is slightly longer with respect to the overall vertical dimension of the receptacle $R_2$ than the flange 102 was with respect to the overall vertical dimension of the receptacle $R_1$.

The cover member $C_2$ which is also circular in horizontal cross section includes an annular skirt 120. The skirt 120 is provided along its lower margin with an annular outwardly struck lip 121, the latter forming an annular shoulder surface 122 on its underside and which is supported on the upper surface of the lip 117 when the cover member $C_2$ is sealed to the receptacle $R_2$ substantially in the manner as shown in FIG. 10. The lip 121 is integrally formed with a downwardly struck rim forming flange 123 which is slightly longer than the flange 118. The flange 123 is sized to snugly engage the exterior surface of the flange 118, in frictional contact, when the cover member $C_2$ is disposed upon the receptacle $R_2$ in the manner as shown in FIGURE 9. The flanges 118, 123 are of sufficient length to have relatively free terminal portions which are capable of being heated to a temperature where they become flexible and are upwardly struck into the groove 119. In the sealing operation to be hereinafter described, the terminal portions of the flanges 118, 123 are sealed in the annular groove 119 to form a perfect liquid-tight seal between the cover member $C_2$ and the receptacle $R_2$. It should also be recognized that the flange 123 is longer than the flange 107 in the cover member $C_1$. Thus by employment of a slightly longer flange 107 and a slightly wider arcuate wall 128 in the female die $M_2$, it is possible to curl both of the flanges 118, 123 to form an annular bead, which is also substantially annular in cross section.

The cover member $C_2$ is sealed to the receptacle $R_2$ in a manner which is somewhat similar to the method employed in sealing the cover member $C_1$ to the receptacle $R_1$ except that a heat seal is formed. The cooperating dies which are employed to seal the cover member $C_2$ to the receptacle $R_2$ are also more fully illustrated in FIGS. 9 and 10., where FIG. 9 shows the dies in the separated position and FIG. 10 shows the dies in the fully engaged position. These dies $M_2$ and $N_2$ are also mounted on the apparatus A in the same manner as the dies $M_1$ and $N_1$ respectively.

The cooperating dies illustrated in FIGS. 9 and 10 generally comprise a female die $M_2$ which cooperates with a male die $N_2$. The dies $M_2$, $N_2$ are also urged together to force the cover member $C_2$ into intimate contact with the upper margin of the receptacle $R_2$ and furthermore, urge the receptacle $R_2$ and cover member $C_2$ disposed thereon into intimate contact with the female die $M_2$. The female die $M_2$ is defined by a substantially frusto-conically shaped interior side wall 124 having an enlarged substantially cylindrical upper end portion 125. The end portion 125 has an arcuate top wall 126 which merges into a generally downwardly and inwardly sloping intermediate wall 127 and extending between the intermediate wall 127 and the frusto-conically shaped side wall 124 is a lower arcuate surface 128 which is concave upwardly in shape and integrally merges into an upwardly extending relatively sharp edge 129 at the point of connection with the side wall 124.

The male die $N_2$ is also substantially circular in horizontal cross section and has an interior S-shaped wall 130, which is sized to engaged the lip 121 of the cover member $C_2$ in the manner as illustrated in FIG. 9. The S-shaped wall 130 integrally merges along its lower end into a downwardly extending relatively sharp guide flange 131. The male die $N_2$ is urged into contact with the upper surface of the cover member $C_2$ and the S-shaped wall 130 engages the exterior surface of the lip 121 in the manner as illustrated in FIG. 9. The female die $M_2$ is substantially circular and is provided with a hollow portion so that it accommodates the receptacle $R_2$ in the manner as illustrated in FIG. 10. When the two dies $M_2$, $N_2$ are urged together in a "sealing position," that is the position as illustrated in FIG. 10, the flange 123 will become disposed over and lie in facewise engagement with the flange 118.

The heating element 51 will create sufficient heat to bring the two flanges 118, 123 to the desired post-forming temperature. It has been found in connection with the present invention that the material in the flanges 118, 123 should be heated to approximately 210 to 240° for the initial forming operation. At this temperature range, the plastic material is sufficiently heated above the low-softening range. Furthermore, it is sufficiently below the reorientation temperature of 225 to 260° F. for this particular type of material employed. It has been found that within this temperature range of 210 to 240° F., approximately 4–6 seconds of preheating are desirable before the post-forming operation. Thereafter, the temperature is raised to a temperature above 260° F. or above the reorientation temperature for the particular material employed. During the post-forming operation, the flanges 118, 123 are bent inwardly and forced into the downwardly opening groove 119 in the manner as illustrated in FIG. 10. However, the temperatures of the flanges have been raised to a point above the reorientation temperature of the material and consequently a fusion is attained. The plastic material actually melts slightly so that the molecules of each of the flanges will mix forming an actual fusion of the two flanges into a unitary flange or reversely bent flange in the manner as illustrated in FIG. 10.

During the post-forming operation, the flanges 118, 123 are bent inwardly and forced into downwardly opening groove 119 a in the manner as illustrated in FIG. 10. These flanges are forced into a substantially upwardly struck vertical position. The two free edge portions of the flanges 118, 123 are spaced from the interior wall of the flange 123 and furthermore, the free edge portion of the flange 123 engages the exterior surface of the receptacle $R_2$. It should be recognized that the bead thus formed provides a fluid-tight seal between the cover member $C_2$ and the receptacle $R_2$.

It can be seen by reference to FIG. 10 that a fluid-tight seal is formed between the cover member $C_2$ and the receptacle $R_2$, not only through the fusion of the two flanges 118, 123 but through the actual forming of the bead itself. In other words, even if a mechanical seal were formed rather than the heat seal, as described in the container $B_2$, the sealed bead would still afford a fluid-tight connection.

It is to be noted by reference to FIGS. 6 and 9, that the U-shaped arcuate surface 128 in the female die $M_2$ is slightly wider in radial dimension than the U-shaped upwardly opening arcuate surface 112 in the female die $M_1$. This upwardly opening wall is designed in such manner in the female die $M_2$ since the bead formed on the container $B_2$ is slightly larger in radial dimension than the bead formed in the container $B_1$.

Figures 11, 12:
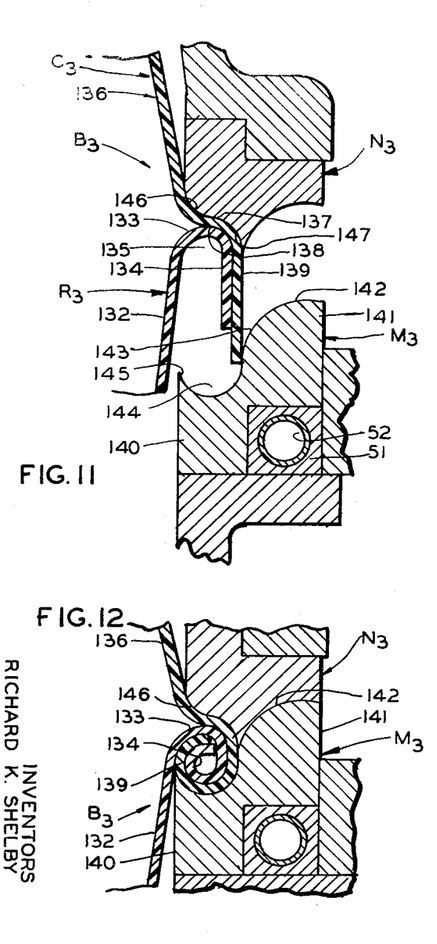
FIG. 11 illustrates the dies which are used to seal the cover member to the receptacle and showing the cover member and receptacle in the separated position.
FIG. 12 shows the dies in the fully engaged position and the cover member permanently sealed to the receptacle.

FIGS. 11 and 12 illustrate a set of dies employed for another modified form of cylindrical shaped container $B_3$ and which is substantially similar to the container $B_1$. The container $B_3$ is circular in horizontal cross section and comprises a cover member $C_3$, which is heat sealed to a receptacle $R_3$ in the manner as shown in FIG. 12. The container $B_3$ is preferably formed in the same manner as the container $B_1$ and is constructed of the same material as the container $B_1$.

The receptacle $R_3$ which is generally circular in horizontal cross section includes an annular skirt forming wall 132. The receptacle $R_3$ is integrally provided along its upper margin with an annular outwardly struck lip 133, which merges into an annularly formed downwardly struck rim forming flange 134 substantially as shown in FIG. 11. The downwardly struck flange 134 is spaced from the skirt-forming wall 132 by a distance which is slightly greater than twice the thickness of the flange 134 and thereby forms a downwardly opening annular groove 135. Furthermore, the flange 134 is substantially parallel to the skirt-forming wall 132. Thus, it can be seen that as the skirt-forming wall 132 has a downwardly converging taper, the flange 134 also projects downwardly in parallel relationship thereto. It is to be noted that the flange 134 is slightly longer with respect to the overall vertical dimension of the receptacle $R_3$ than the flange 102 was with respect to the overall vertical dimension of the receptacle $R_1$. The flange 134 is also longer than the similar flange 118 in the receptacle $R_2$ of the container $B_2$.

The cover member $C_3$ which is also circular in horizontal cross section includes an annular skirt 136. The skirt 136 is provided along its lower margin with an annular outwardly struck lip 137, the latter forming an annular shoulder surface 138 on its underside and which is supported on the upper surface of the lip 133 when the cover member $C_3$ is sealed to the receptacle $R_3$ substantially in the manner as shown in FIG. 12. The lip 137 is integrally formed with a downwardly struck rim forming flange 139 which is slightly longer than the flange 134. In this connection, it should also be noted that the flange 139 is longer than the flange 123 of the container $B_2$. The flange 139 is sized to snugly engage the exterior surface of the flange 134 in frictional contact when the cover member $C_3$ is disposed upon the receptacle $R_3$ in the manner as shown in FIG. 11. The flanges 134, 139 are of sufficient length to have relatively free terminal portions which are capable of being heated to a temperature where they become flexible and are upwardly struck into the grove 135. In the sealing operation to be hereinafter described, the terminal portions of the flanges 134, 139 are sealed in the annular groove 135 to form a perfect liquid-tight seal between the cover member $C_3$ and the receptacle $R_3$.

The cover member $C_3$ is sealed to the receptacle $R_3$ in a manner which is similar to the method employed in sealing the cover member $C_1$ to the receptacle $R_1$. Similar female and male dies $M_3$ and $N_3$, respectively are also employed. As indicated above, the flanges 134, 139 in the container $B_3$ are longer than the same flanges in the container $B_2$. When the two dies $M_3$, $N_3$ are forced together, the flanges 134, 139 are urged upwardly into the groove 135. In the case of the container $B_2$, the flanges were substantially vertically disposed so that in effect, the flanges were U-shaped after the sealing operation. In the case of the container $B_3$, the flanges 134, 139 being substantially longer, are bent over so that they are substantially horizontally disposed. In effect, the free terminal portions of the flanges 134, 139 are rotated approximately 270° and the free ends thereof point toward the vertical portions of the flanges 134, 139.

Again, it should be recognized that the two flanges 134, 139 are not fused through a heat sealing operation. It is the pressure applied to the cover member $C_3$ in combination with the heat causing both of the flanges to become readily deformable which causes each of the flanges to curl in the form of this annular bead. However, it should be recognized that the bead nevertheless provides a fluid-tight seal between the cover member $C_3$ and the receptacle $R_3$. It is to be noted by reference to FIG. 12 that both of the flanges 134, 139 are concentrically turned inwardly and curled and this curl forms a mechanical air-tight connection between each of the sections. The bead between the two sections is substantially annular in transverse cross section and thereby affords a smooth substantially round free edge having the advantage of affording an especially pleasing finished appearance and which is comfortable when grasped by a user's fingers.

The cover member $C_3$ is sealed to the receptacle $R_3$ in a manner which is somewhat similar to the method employed in sealing the cover member $C_1$ to the receptacle $R_1$. Again, a mechanical seal rather than a heat seal is formed between the cover member and the receptacle. However, it should be recognized that a heat seal could be formed as well in a manner similar to the method employed with the container $B_2$. The cooperating dies which are employed to seal the cover member $C_3$ to the receptacle $R_3$ are also more fully illustrated in FIGS. 11 and 12, where FIG. 11 shows the dies in the separated position and FIG. 12 shows the dies in the fully engaged position. These dies $M_3$ and $N_3$ are also mounted on the apparatus A in the same manner as the dies $M_1$ and $N_1$ respectively.

The cooperating dies illustrated in FIGS. 11 and 12 generally comprise a femal die $M_3$ which cooperates with a male die $N_3$. The dies $M_3$, $N_3$ are also urged together to force the cover member $C_3$ into intimate contact with the upper margin of the receptacle $R_3$ and furthermore, urge the receptacle $R_3$ and cover member $C_3$ disposed thereon into intimate contact with the female die $M_3$. The female die $M_3$ is defined by a substantially frusto-conically shaped interior side wall 140 having an enlarged substantially cylindrical upper end portion 141. The end portion 141 has an arcuate top wall 142 which merges into a generally downwardly and inwardly sloping intermediate wall 143 and extending between the intermediate wall 143 and the frusto-conically shaped side wall 140 is a lower arcuate surface 144, which is concave upwardly in shape and integrally merges into an upwardly extending relatively sharp edge 145 at the point of connection with the side wall 140.

The male die $N_3$ is substantially circular in horizontal cross section and has a rounded S-shaped lower interior wall 146 which engages the lip 137 of the cover member $C_3$ and which integrally merges at its lower end into a downwardly extending relatively sharp guide flange 147.

The male die $N_3$ is urged into contact with the upper surface of the cover member $C_3$ and the arcuate surface 144 of the die $N_3$ engages the lip 137 of the cover member $C_3$ in the manner as in FIG. 11. The female die $M_3$ is substantially circular and provided with a hollow portion so that it acommodates the receptacle $R_3$ in the manner as illustrated in FIG. 12. When the two dies $M_3$, $N_3$ are urged together in a "sealing position," that is the position as illustrated in FIG. 12, the flange 139 will become disposed over and lie in facewise engagement with the flange 134. The heating element 51 will create sufficient heat to bring the two flanges 134 and 139 to the desired post-forming temperature. It has been found in connection with the present invention that the material in the flanges 134, 139 should be heated to approximately 210 to 240° F. for the post-forming operation. At this temperature range, the plastic material is sufficiently above the low-softening range and furthermore, sufficiently below the reorientation temperature of 225 to 260° F. for the particular type of material employed. It has been found that within this temperature range of 210 to 240° F. approximately 6–10 seconds of preheating are desirable before the post-forming operation. During the post-forming operation, the flanges 134, 139 are both bent inwardly and forced into the downwardly opening groove 135 in the manner as illustrated in FIG. 12. The post-forming operation takes place in the matter of a fraction of a second so that the reorientation of the plastic material does not take place. The two dies $M_3$, $N_3$ are moved toward each other in the post-forming operation at a rate of speed which prevents over-heating and possible shrinking and undesired curling of either of the flanges 134, 139.

Again, it should be recognized that the two flanges 134, 139 are not fused through a heat sealing operation. It is the pressure applied to the cover member in combination with the heat causing both of the flanges to become readily deformable which causes each of the flanges to curl in the form of this annular bead. However, it should be recognized that the bead nevertheless provides a fluid-tight seal between the cover member $C_3$ and the receptacle $R_3$. It is to be noted by reference to FIG. 12 that both of the flanges 134, 139 are concentrically turned inwardly and curled and this curl forms a mechanical air-tight connection between each of the sections. The bead between the two sections is substantially annular in transverse cross section and thereby affords a smooth substantially round free edge having the advantage of affording an especially pleasing finished appearance and which is comfortable when grasped by a user's fingers.

Figure 14:
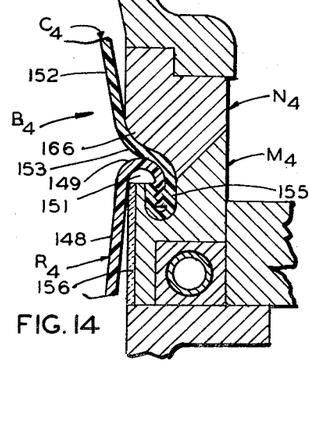
FIG. 14 shows the dies in the fully engaged position and the cover member permanently sealed to the receptacle.

FIGS. 13 and 14 illustrate a set of dies for sealing another modified form of circularly shaped container $B_4$ and which is similar to the previously described containers $B_1$–$B_3$. The container $B_4$ is circular in horizontal cross section and comprises a cover member $C_4$ which is heat sealed to a receptacle $R_4$, in the manner as shown in FIG. 14. The container $B_4$ is formed in the same manner as the container $B_1$ and moveover, is constructed of the same material as the container $B_1$. While the container $B_4$ is illustrated as being heat sealed, it should be recognized that the cover member $C_4$ can be mechanically sealed to the receptacle $R_4$ in the same manner as the cover member $C_1$ was sealed to the receptacle $R_1$ in the container $B_1$. The receptacle $R_4$, which is generally circular in horizontal cross section includes an annular skirt forming wall 148. The receptacle $R_4$ is integrally provided along its upper margin with an annular outwardly struck lip 149, which merges into an annularly formed downwardly struck rim forming flange 150 substantially as shown in FIG. 13. The downwardly struck flange 150 is spaced from the skirt-forming wall 148 by a distance which is approximately equal to twice the thickness of the flange 150 and thereby forms a downwardly opening annular groove 151. Furthermore, the flange 150 is substantially parallel to the skirt-forming wall 148. Thus, it can be seen that as the skirt-forming wall 148 has a downwardly converging taper, the flange 150 also projects downwardly in parallel relationship thereto. It is to be noted that the flange 150 has substantially the same length as the flange 107 in the receptacle $R_1$.

The cover member $C_4$ which is also cylindrical in horizontal cross section includes an annular skirt 152. The skirt 152 is provided along its lower margin with an annular outwardly struck lip 153, the latter forming an annular shoulder surface 154 on its underside and which is supported on the upper surface of the lip 149 when the cover member $C_4$ is sealed to the receptacle $R_4$ substantially in the manner as shown in FIG. 14. The lip 153 is integrally formed with a downwardly struck rim forming flange 155 which is slightly longer than the flange 150. The flange 155 is sized to snugly engage the exterior surface of the flange 150 in frictional contact when the cover member $C_4$ is disposed upon the receptacle $R_4$ in the manner as shown in FIG. 13. The flange 155 is of sufficient length to have a relatively free terminal portion which is capable of being heated to a temperature where it becomes flexible and is upwardly struck into the groove 151. In the sealing operation to be hereinafter described, the terminal portion of the flange 155 is sealed in the annular groove 151 to form a perfect liquid-tight seal between the cover member $C_4$ and the receptacle $R_4$.

The cover member $C_4$ is heat sealed to the receptacle $R_4$ in a manner which is somewhat similar to the method employed in sealing the cover member $C_2$ to the receptacle $R_2$. The cooperating dies which are employed to seal the cover member $C_4$ to the receptacle $R_4$ are also more fully illustrated in FIGS. 13 and 14 where FIG. 13 shows the dies in the separated position and FIG. 14 shows the dies in the fully engaged position. The dies are also mounted on the work table 2.

The cooperating dies illustrated in FIGS. 13 and 14 generally comprise a female die $M_4$ which cooperates with a male die $N_4$. The dies $M_4$, $N_4$ are also urged together to force the cover member $C_4$ into intimate contact with the upper margin of the receptacle $R_4$ and furthermore, urge the receptacle $R_4$ and cover member $C_4$ disposed thereon into intimate contact with the female die $M_4$. The female die $M_4$ is formed with a frusto-conically shaped interior side wall 156 which matches the skirt-forming wall 148 of the receptacle $R_4$. The female die $M_4$ is also formed with an enlarged head portion 157, which has an upper inclined wall 158 which matches an inclined wall 159 on the male die $N_4$. The inclined wall 158 merges into a generally upward opening, U-shaped groove 160 with a downwardly sloping intermediate wall 161. The intermediate wall 161 merges into a lower arcuate surface 162 which is concave upwardly in shape and integrally merges into an upwardly extending relatively flat side wall 163. The U-shaped groove 160 is spaced from the frusto-conically side wall 156 by a flat top wall 164 in the manner as illustrated in FIG. 13. An annular heat insulating member 165 is secured to the wall 156 and protects the skirt-forming wall 148 of the receptacle $R_4$ during the sealing operation.

The male die $N_4$ is similar to the male die $N_3$ and also has lower S-shaped wall 166 which engages the exterior surface of the lip 153. The S-shaped wall 166 integrally merges into a downwardly projecting lower edge 166, which in turn forms the lower margin of the wall 159, in the manner as illustrated in FIG. 13.

The male die $N_4$ is urged into contact with the upper surface of the cover member $C_4$ and the S-shaped wall 166 engages the exterior surface of the lip 149 in the manner as illustrated in FIG. 13. The female die $M_4$ is substantially circular and is provided with a hollow portion so that it accommodates the receptacle $R_4$ in the manner as illustrated in FIG. 14. When the two dies $M_4$, $N_4$ are urged together in a "sealing position," that is the position as illustrated in FIG. 14, the flange 155 will become disposed over and lie in facewise engagement with the flange 150.

The heating element 51 will create sufficient heat to bring the two flanges 150, 155 to the desired post-forming temperature. It has been found in connection with the present invention that the material in the flanges 150, 155 should be heated to approximately 210 to 240° for the initial forming operation. At this temperature range, the plastic material is sufficiently heated above the low-softening range. Furthermore, it is sufficiently below the reorientation temperature of 225 to 260° F. for this particular type of material employed. It has been found that within this temperature range of 210 to 240° F., approximately 4–6 seconds of pre-heating are desirable before the post-forming operation. Thereafter, the temperature is raised to a temperature above 260° F. or above the orientation temperature for the particular material employed. During the post-forming operation, the flange 155 is bent inwardly and forced into the downwardly opening groove 151 in the manner as illustrated in FIG. 14. However, the temperatures of the flanges have been raised to a point above the reorientation temperature of the material and consequently a fusion is attained. The plastic material actually melts slightly so that the molecules to each of the flanges will mix forming an actual fusion of the two flanges into a unitary flange in the manner as illustrated in FIG. 14.

By reference to FIG. 14, it can be seen that the free edge portion of the flange 155 which has been softened is urged into the groove 151 so that it is in a substantially upwardly struck vertical position. Furthermore, the free edge portion of the flange 155 is spaced from the exterior wall of the receptacle $R_4$ by a distance which is approximately equal to the thickness of the flange 155 and also engages the interior wall of the flange 150. It should be recognized that while a heat seal is performed, a mechanical seal of the type employed in the container $B_1$ could also be used to obtain a fluid-tight connection between the cover member $C_4$ and the receptacle $R_4$.

FIGS. 15–17 illustrate the set of dies and method employed for sealing two-piece container sets $B_5$ which are non-circular and preferably rectangular in horizontal cross section. The container $B_5$ is similarly formed with nestable cover members $C_5$ and nestable receptacles $R_5$. The container $B_5$ is formed in the same manner as any of the previously described containers and of the same material.

19

The receptacle R₅, which is generally rectangular in horizontal cross section includes four upwardly and outwardly diverging side walls 167 which are connected along their lower margins by a relatively flat bottom wall (not shown). In this connection, it should be understood that the container B₅ of the present invention is not limited to receptacles having non-uniform cross sectional areas and that each of the side walls 167 could be relatively vertical, thereby forming containers having uniformly sized cross sectional areas along their entire length. Each of the side walls 167 is provided along its upper margin with annular outwardly extending horizontal lips 168 which integrally merge into downwardly extending rim-forming flanges 169. The flanges 169 extend in a direction which is parallel to each of the matching walls 167 and are spaced from the walls 167 by a distance which is approximately equal to the thickness of the flanges 169 thereby forming an annular groove 170.

The cover member C₅, which is similarly rectangular in horizontal cross section is formed with four upwardly and inwardly converging side walls 171, which are connected along their upper margins by a relatively flat top wall (not shown). The four side walls 171 integrally merge into outwardly extending relatively flat side wall portions 172, which are located at a greater dihedral angle than the side walls 171 and integrally merge into upwardly opening U-shaped reinforcing channels 173. The reinforcing channels 173 consist of a downwardly extending wall 174, which integrally merges into the lower end of the side wall portions 172 and a contact wall 175, which is spaced from the wall 174 and connected by a bight portion 176. The contact wall 175 integrally merges into an outwardly extending annular lip 177 which in turn, integrally merges into a downwardly extending rim-forming flange 178, thereby forming a downwardly opening U-shaped channel 179.

By further reference to FIG. 15, it can be seen that the distance between the exterior surface of the wall 175 and the interior surface of the flange 178 is substantially equal to the width of the U-shaped groove 170 and the combined thickness of the wall 167 and the flange 169 so that when the cover member C₅ is disposed upon the receptacle R₅, the undersurface of the lip 177 bears against the upper surface of the horizontal lip 168, the flange 178 engages the outer surface of the flange 169 and the U-shaped reinforcing channel 173 fits snugly within the upper open end of the receptacle R₅, where the exterior surface of the engaging wall 175 snugly engages the interior surface of the wall 167 along its upper margin. The flange 169 is spaced from the side wall 167 by a distance which is approximately equal to the thickness of the flange 178, and the length of the flange 178 is sufficient so that it can be heated and tucked into the area formed by the groove 170 and permanently heat sealed therein.

The cover member C₅ is sealed to the receptacle R₅ by use of male and female dies N₅, M₅ respectively as illustrated in FIGS. 15 to 17. The dies M₅ and N₅ are also mounted on the apparatus A in the same manner as the dies M₅ and N₁ respectively.

The male die N₅ is substantially rectangular in horizontal cross section and includes a relatively vertical interior wall 180 and a downwardly and inwardly inclined exterior wall 181. The interior wall 180 integrally merges into a rectangularly shaped downwardly extending projection 182 having a bottom face 183 and an outwardly presented flat face 184. The flat face 184 in turn, merges into a downwardly facing upper wall 185 which is connected through a relatively sharp marginal edge 186 to the inclined exterior wall 181.

The female die M₅ includes four downwardly converging side walls 187 which engage the side walls 167 of the receptacle R₅. The side walls 187 integrally merge into an upper end portion 188 which is formed by a

20 downwardly inclined upper guide surface 189, the latter integrally merging into a downwardly extending intermediate portion 190. By further reference to FIGS. 15 and 16, it can be seen that the intermediate portion 190 merges into an arcuate lower surface 191 which is concave upwardly in shape. The surface 191 integrally merges into an upwardly extending relatively sharp marginal edge 192 substantially as shown in FIG. 15. Surrounding the female die M₅ is the retaining ring 52 which carries the electrically operated heating element 51.

The male die N₅ is urged into contact with the upper surface of the cover member C₅ and the projection 182 will extend into the upwardly opening U-shaped reinforcing channel 173. The female die M₅ is substantially circular and provided with a hollow portion so that it accommodates the receptacle R₅ in the manner as illustrated in FIG. 16. When the two dies M₅, N₅ are urged together in a "sealing position," that is the position as illustrated in FIG. 16, the flange 178 will become disposed over and lie in facewise engagement with the flange 169.

The heating element 51 will create sufficient heat to bring the two flanges 178, 169 to the desired post-forming temperature. It has been found in connection with the present invention that the material in the flanges 169, 178 should be heated to approximately 210–240° F. for the initial forming operation. At this temperature range, the plastic material is sufficiently heated above low-softening range. Furthermore, it is sufficiently below the reorientation temperature of 225 to 260° F. for this particular type of material employed. It has been found that within this temperature range of 210 to 240° F., approximately 4 to 6 seconds of preheating are desirable before the post-forming operation. Thereafter, the temperature is raised to a temperature above 260° F. or above the orientation temperature for the particular material employed. During the post-forming operation, the flange 178 is bent inwardly and forced into the downwardly opening groove 170 in the manner as illustrated in FIG. 17. However, the temperatures of the flanges have been raised to a point above the reorientation of the material and consequently a fusion is attained. The plastic material actually melts slightly so that the molecules of each of the flanges will mix forming an actual fusion of the two flanges into a unitary structure in the manner as illustrated in FIG. 17.

It should be recognized that a mechanical seal could also have been formed without the actual fusion between the two flanges. This type of seal would have been similar to the seal attained in the container B₁.

It can be seen by reference to FIG. 16 that the projection 182 will engage the upwardly opening U-shaped reinforcing channel 173 and thereby prevent collapsing of the side walls 174, 175 forming part of the cover member C₅. The horizontal lips 168 are sized so that they fit snugly within the downwardly opening U-shaped channel 179 in which manner the surface of the contact wall 175 engages the interior surface of the wall 167 along their upper margin. In this manner, both the cover member C₅ and the receptacle R₅ are prevented from collapsing when pressure from the male die N₅ is applied to the cover member C₅.

FIGS. 18 and 19 illustrate a set of dies used for sealing a modified form of rectangularly shaped container B₆ which generally comprises a cover member C₆ and a receptacle R₆. The container B₆ is formed in the same manner and of the same material as the container B₁. While the container B₆ is illustrated as being mechanically sealed, it should be recognized that the cover member C₆ can be heat sealed to the receptacle R₆ in the same manner as the cover member C₅ was sealed to the receptacle R₅ in the container B₅. The receptacle R₆, which is generally rectangular in horizontal cross section includes four upwardly and outwardly diverging side walls 193. In this connection, it should be understood that the container $B_6$ of the present invention is also not limited to receptacles having non-uniform cross sectional areas and that each of the side walls 193 could be relatively vertical, thereby forming containers having uniformly sized cross sectional areas along their entire length. Each of the side walls 193 is provided along its upper margin with annular outwardly extending horizontal lips 194 which integrally merge into downwardly extending rim-forming flanges 195. The flanges 195 extend in a direction which is parallel to each of the matching side walls 193 and are spaced from the walls 193 by a distance which is slightly greater than twice the thickness of the flange 195, thereby forming an annular groove 196.

The cover member $C_6$ which is similarly rectangular in horizontal cross section is formed with four upwardly and inwardly converging side walls 197 which are connected along their upper margins by a relatively flat top wall (not shown). The four side walls 197 integrally merge into outwardly extending relatively flat side wall portions 198 which are located at a greater dihedral angle than the side walls 197 and integrally merge into upwardly opening U-shaped reinforcing channels 199. The reinforcing channels 199 consist of a downwardly extending wall 200 which integrally merges into the lower end of the side wall portions 198 and a contact wall 201 which is spaced from the wall 200 and connected by a bight portion 202. The contact wall 201 integrally merges into an outwardly extending annular lip 203 which, in turn, integrally merges into a downwardly extending rim-forming flange 204, thereby forming a downwardly opening U-shaped channel 205.

By further reference to FIG. 18, it can be seen that the distance between the exterior surface of the wall 201 and the interior surface of the flange 204 is substantially equal to the width of the U-shaped groove 191 and the combined thickness of the wall 193 and the flange 195. When the cover member $C_6$ is disposed upon the receptacle $R_6$, the undersurface of the lip 203 bears against the upper surface of the horizontal lip 194 and the flange 204 engages the outer surface of the flange 195. The U-shaped reinforcing channel 199 fits snugly within the upper open end of the receptacle $R_6$, where the exterior surface of the engaging wall 201 snugly engages the interior surface of the wall 193 along its upper margin. The flange 195 is spaced from the side wall 193 by a distance which is slightly greater than twice the thickness of the flange 195.

The cover member $C_6$ is sealed to the receptacle $R_6$ in a manner which is substantially similar to the method employed in sealing the cover member $C_1$ to the receptacle $R_1$. The cooperating dies which are employed to seal the cover member $C_1$ to the receptacle $R_1$ comprises a cooperating male die $N_6$ and female die $M_6$ and are also more fully illustrated in FIG. 18 and 19. FIG. 18 shows the dies in the separated position and FIG. 19 shows the dies in the fully engaged position.

The male die $N_6$ is substantially rectangular in horizontal cross section and includes a relatively vertical interior wall 206 and a downwardly and inwardly inclined exterior wall 207. The interior wall 206 integrally merges into a rectangularly shaped downwardly extending projection 208 having a bottom face 209 and an outwardly presented flat face 210. The flat face 210, in turn, merges into a downwardly facing upper wall 211 and which is connected through a relatively sharp marginal edge 212 to the inclined exterior wall 207.

The female die $M_6$ includes four downwardly converging side walls 213 which engage the side walls 193 of the receptacle $R_6$. The side walls 213 integrally merge into an upper end portion 214 which is formed by a downwardly inclined upper guide surface 215, the latter integrally merging into a downwardly extending upwardly opening U-shaped groove 216. The U-shaped groove 216 is spaced from the side wall 213 by a flat top wall 217. An annular heat insulating member 218 is secured to the wall 213 and protects the skirt 193 of the receptacle $R_6$ during the sealing operation. Surrounding the female die $M_6$ is a retaining ring 52 which carries the electrically operated heating element 51.

The male die $N_6$ is urged into contact with the upper surface of the cover member $C_6$ and the projection 208 will extend into the upwardly opening U-shaped reinforcing channel 199. The female die $M_6$ is substantially rectangular and provided with a hollow portion so that it accommodates the receptacle $R_6$ in the manner as illustrated in FIG. 19. When the two dies $M_6$, $N_6$ are urged together in a "sealing position," that is the position as illustrated in FIG. 19, the flange 204 will become disposed over and lie in facewise engagement with the flange 195.

Furthermore, the flanges 195, 204 are brought into intimate contact with the heated female die $M_6$. The flange 204 then engages the upper guide surface 215 and is guided into contact with the exterior wall of the U-shaped groove 216. The terminal margin of the flange 204 is heated to a temperature where it is readily deformable as shown in FIG. 19, and continued downward pressure on the cover member $C_6$ will cause the readily deformable free margin of the flange 204 to curl along the lower surface of the groove 216 until it is forced into the groove 196 of the receptacle $R_6$. The heating element 51 will create sufficient heat to bring the flanges 195, 204 to the desired post-forming temperature. Again, it has been found in connection with the present invention that the material in the flanges 195, 204 should be heated to approximately 210 to 240° F. for the post-forming operation. This temperature is sufficiently below the orientation temperature of 225 to 260° F. for the particular type of material employed. In effect, the free edge portion of the flange 204 which has been softened is urged into the groove 196 so that it is held in a substantially upwardly struck vertical position. Furthermore, the free edge portion of the flange 204 is spaced from the exterior wall of the receptacle $R_6$ by a distance which is approximately equal to the thickness of the flange 204 and also frictionally engages the interior wall of the flange 195. Again, the post-forming operation takes place in a matter of a fraction of a second so that the reorientation of the plastic material does not take place. The two dies are moved toward each other in the post-forming operation at a rate of speed which prevents overheating and possible shrinking and undesired curling of the flange. Consequently, a fluid-tight mechanical seal is thereby attained.

It can be seen, by reference to FIG. 19, that the projection 208 will engage the upwardly opening U-shaped reinforcing channel 199 and thereby prevent collapsing of the side walls 197, forming part of the cover member $C_6$. The horizontal lips 194 are sized so that they fit snugly within the downwardly U-shaped channel 205 in which manner the surface of the contact wall 201 engages the interior surface of the walls 193 along their upper margin. In this manner, both the cover member $C_6$ and the receptacle $R_6$ are prevented from collapsing when pressure from the male die $N_6$ is applied to the cover member $C_6$.

FIGS. 20 and 21 illustrate the dies employed in another modified form of rectangularly shaped container $B_7$ which comprises a cover member $C_7$ and a receptacle $R_7$. The container $B_7$ is illustrated with a heat seal as shown in FIG. 21. The container $B_7$ is formed in the same manner as the container $B_5$ and moreover of the same material as the container $B_5$. While the container $B_7$ is illustrated with a heat seal, it should be recognized that a mechanical seal could be employed as well in order to attain a fluid-tight connection between the cover member $C_7$ and the receptacle $R_7$.

The receptacle $R_7$ which is generally rectangular in horizontal cross section includes four upwardly and outwardly diverging side walls 219. In this connection, it should be understood that the container $B_7$ of the present invention is also not limited to receptacles having non-uniform cross sectional areas and that each of the side walls 219 could be relatively vertical, thereby forming containers having uniformly sized cross sectional areas along their entire length. Each of the side walls 219 is provided along its upper margin with annular outwardly extending horizontal lips 220 which integrally merge into downwardly extending rim-forming flanges 221. The flanges 221 extend in a direction which is parallel to each of the matching side walls 219 and are spaced from the walls 219 by a distance which is slightly greater than twice the thickness of the flanges 221, thereby forming an annular groove 222.

The cover member $C_7$, which is similarly rectangular in horizontal cross section is formed with four upwardly and inwardly converging side walls 223, which are connected along their upper margins by a relatively flat top wall (not shown). The four side walls 223 integrally merge into outwardly extending relatively flat side wall portions 224 which are located at a greater dihedral angle than the side walls 223 and integrally merge into upwardly opening U-shaped reinforcing channels 225. The reinforcing channels 225 consist of a downwardly extending wall 226 which integrally merges into the lower end of the side wall portions 224 and a contact wall 227 which is spaced from the wall 226 and connected by a bight portion 228. The contact wall 227 integrally merges into an outwardly extending annular lip 229 which, in turn, integrally merges into a downwardly extending rim-forming flange 230, thereby forming a downwardly opening U-shaped channel 231.

By further reference to FIG. 20, it can be seen that the distance between the exterior surface of the wall 227 and the interior surface of the flange 230 is substantially equal to the width of the U-shaped grove 222 and the combined thickness of the wall 219 and the flange 221. When the cover member $C_7$ is disposed upon the receptacle $R_7$, the undersurface of the lip 229 bears against the upper surface of the horizontal lip 220, the flange 230 engages the outer surface of the flange 221 and the U-shaped reinforcing channel 225 fits snugly within the upper open end of the receptacle $R_7$, where the exterior surface of the contact wall 227 snugly engages the interior surface of the wall 219 along its upper margin. The flange 221 is spaced from the side wall 219 by a distance which is slightly greater than twice the thickness of the flange 221. It should be recognized that the flanges 221, 230 of the container $B_7$ are longer than the respective flanges 195, 204 in the container $B_6$.

The cover member $C_7$ is sealed to the receptacle $R_7$ in a manner which is similar to the method employed in sealing the cover member $C_5$ to the receptacle $R_5$. Female and male dies $M_7$, $N_7$, respectively are also employed and are substantially similar to the previously described dies $M_5$, $N_5$ and are, therefore, not described in detail herein.

When the two dies $M_7$, $N_7$ are urged together in a "sealing position," that is the position as illustrated in FIG. 21, the flange 230 will become disposed over and lie in facewise engagement with the flange 221.

The heating element 51 will create sufficient heat to bring the two flanges 221, 230 to the desired post-forming temperature. It has again been found in connection with the present invention that the material in the flanges 221, 230 should be heated to approximately 210–240° F. for the initial forming operation. At this temperature range, the plastic material is sufficiently heated above low-softening range. Furthermore, it is sufficiently below the reorientation temperature of 225 to 260° F. for this particular type of material employed. It has been found that within this temperature range of 210 to 240° F., approximately 4 to 6 seconds of preheating are desirable before the post-forming operation. Thereafter, the temperature is raised to a temperature above 260° F. or above the reorientation temperature for the particular material employed. During the post-forming operation, the flanges 221, 230 are bent inwardly and forced into the downwardly opening groove 222 in the manner as illustrated in FIG. 21. However, the temperatures of the flanges have been raised to a point above the orientation of the material and consequently a fusion is attained. The plastic material actually melts slightly so that the molecules of each of the flanges will mix forming an actual fusion of the two flanges into a unitary structure in the manner as illustrated in FIG. 21.

It should be recognized that a mechanical seal could also have been formed without the actual fusion between the two flanges. This type of seal would have been similar to the seal attained in the container $B_6$.

Each embodiment of the apparatus herein contained employs a male die and a female die, the former of which is more specifically referred to in the art as a "punch." The apparatus of the present invention is also adapted for use with a positioning punch and a curling punch. The positioning punch would be equivalent to any of the male dies described herein which also presently serve as a curling punch. However, it is also possible to employ a separate punch which will function at the curling punch. In this event, the positioning punch is shifted away from the cover member after the cover member has been placed in contact with the receptacle and the flanges thereof in contact with the heated female die. The curling punch would function somewhat as a ram and would merely contain a flat bottom face designed to force the two flanges on the receptacle and cover member into intimate contact. Again, the curling must be performed at a constant velocity as in each of the aforementioned embodiments of the present invention. A constant velocity is critical inasmuch as the plastic material will only flow at a certain rate and if the velocity is too fast, the plastic material will wrinkle. It has been found that in the curling operation, a pressure of approximately 30 p.s.i. has been found to be most suitable. The apparatus A of the present invention could easily be adapted to this type of structure by the addition of another station to perform the curling operation with a curling punch.

It will be appreciated by those skilled in the art that although the method of the present invention and the dies set forth herein are designed to seal cover members to receptacles of the type disclosed herein, this is really by way of illustration and not by way of limitation and that the present invention is also well adapted for the production of other containers which have separate nestable portions.

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

1. The method of sealing a cover member to a receptacle wherein said receptacle is provided with a groove in the area of adjoinment and said cover member is provided with a flange; said method comprising locating the receptacle at a first work station in a work-holding element, moving said receptacle in said work-holding element from said first work station to a second work station, filling said receptacle as it moves from the first work station to the second work station, disposing said cover member on said receptacle in a closurewise position at said second work station, moving said receptacle to a third work station and forcing said cover member into intimate contact with the upper margins of said receptacle at said third work station, heating the material forming the groove on said receptacle and the flange on said cover member as said receptacle and cover member move from the third work station to a fourth work station and forcing the flange into said groove where it becomes permanently sealed therein, and removing the filled receptacle and cover member at said fourth work station.

2. The method of sealing a cover member to a receptacle wherein said receptacle is provided with a flange and a groove in the area of adjoinment and said cover member is provided with a flange; said method comprising disposing said cover member on said receptacle in a closurewise position, heating the flanges on said cover member and said receptacle, engaging the flanges against a curved shaping member, and forcing reversely bent portions of said flanges into said groove where the reversely bent portions are upwardly struck in said groove and are substantially parallel to said flanges to thereby permanently seal said cover member and receptacle to form a unitary member.

3. The method of claim 2 further characterized in that the reversely bent portion of the flange on said cover member frictionally engages the body portion of said receptacle.

4. The method of sealing a cover member to a receptacle wherein said receptacle is provided with a groove in the area of adjoinment and said cover member is provided with a flange; said method comprising disposing said cover member on said receptacle in a closurewise position, heating the flange and material forming the groove on said receptacle, engaging the flange of said cover member against a curved shaping member, and forcing said flange on said cover member into said groove where the flange on said receptacle remains relatively straight and uncurled and the flange on said cover member is urged into said groove so that it forms a substantial U-shape, the portion of the flange of said cover member being urged into said groove being spaced from the unbent portion of said flange on said receptacle by a distance which is approximately equal to the thickness of the flange on said cover member to thereby permanently seal said cover member and receptacle to form a unitary member.

5. The method of sealing a cover member to a receptacle wherein said receptacle is provided with a flange and a groove in the area of adjoinment and said cover member is provided with a flange; said method comprising disposing said cover member on said receptacle in a closurewise position, heating the flangeson said cover member and said receptacle, engaging the flanges against a curved shaping member, and forcing and reversely bending first portions of said flanges into said groove where the first portions are upwardly struck in said groove and are substantially parallel to the unbent portions of said flanges forcing and bending second portions of said flanges on the end of said first portions in a substantially horizontal direction so the second portions terminate in a direction forcing the unbent portions of said flanges, to thereby permanently seal said cover member and receptacle to form a unitary member.

6. The method of claim 5 further characterized in that the reversely bent portion of said cover member frictionally engages the body portion of said receptacle.

References Cited

UNITED STATES PATENTS

| | | | |
|---|---|---|---|
| 2,859,575 | 11/1958 | Lehmann | 53—366 X |
| 2,916,861 | 12/1959 | Lehmann | 53—366 X |
| 3,309,836 | 3/1967 | Hallowell | 53—39 |

TRAVIS S. McGEHEE, Primary Examiner

U.S. Cl. X.R.

53—329